US00RE45450E

(19) United States
(12) Reissued Patent
Murakami

(10) Patent Number: US RE45,450 E
(45) Date of Reissued Patent: Apr. 7, 2015

(54) METHOD FOR PRODUCING GLASS WOOL MOLDED PRODUCT, GLASS WOOL MOLDED PRODUCT, AND VACUUM INSULATION MATERIAL

(71) Applicant: Mag-Isover K.K., Chiyoda-ku, Tokyo (JP); Panasonic Corporation, Kadoma-Shi, Osaka (JP)

(75) Inventor: Toru Murakami, Tokyo (JP)

(73) Assignees: Mag-Isover K.K., Tokyo (JP); Panasonic Corporation, Osaka (JP)

(21) Appl. No.: 13/845,639

(22) Filed: Mar. 18, 2013

Related U.S. Patent Documents

Reissue of:

(64) Patent No.: 7,846,371
Issued: Dec. 7, 2010
Appl. No.: 11/921,806
PCT Filed: Oct. 24, 2005
PCT No.: PCT/JP2005/019496
§ 371 (c)(1),
(2), (4) Date: Oct. 16, 2008
PCT Pub. No.: WO2006/132001
PCT Pub. Date: Dec. 14, 2006

(30) Foreign Application Priority Data

Jun. 7, 2005 (JP) ..... 2005-167022

(51) Int. Cl.
*B27N 3/04* (2006.01)
*B29C 47/00* (2006.01)
*B29C 47/88* (2006.01)

(52) U.S. Cl.
CPC ..... *B29C 47/0014* (2013.01); *B29C 47/88* (2013.01)

(58) Field of Classification Search
USPC ..... 264/322, 640; 65/455, 456
See application file for complete search history.

(56) References Cited

U.S. PATENT DOCUMENTS

| | | | | |
|---|---|---|---|---|
| 3,271,485 | A * | 9/1966 | Canfield | 264/405 |
| 3,347,648 | A * | 10/1967 | Krakauer et al. | 65/450 |
| 2002/0167105 | A1 | 11/2002 | Jung et al. | |
| 2006/0234006 | A1 * | 10/2006 | Tenra | 428/69 |
| 2006/0263585 | A1 | 11/2006 | Yuasa et al. | |

FOREIGN PATENT DOCUMENTS

| | | |
|---|---|---|
| EP | 1 510 747 A1 | 3/2005 |
| JP | 07-167376 | 7/1995 |
| JP | 07-167376 A | 7/1995 |
| JP | 2003-532845 A | 11/2003 |
| JP | 2003-532845 T | 11/2003 |

(Continued)

OTHER PUBLICATIONS

Liquids and Fluids—Specific Heats, The Engineering ToolBox, http://www.engineeringtoolbox.com/specific-heat-fluids-d_151.html, accessed Jun. 19, 2014, 8 pages.*

(Continued)

*Primary Examiner* — Matthew Daniels
(74) *Attorney, Agent, or Firm* — Carrier Blackman & Associates, P.C.; Joseph P. Carrier; William D. Blackman

(57) ABSTRACT

A method for producing a glass wool molded product includes the steps of processing a glass material into fibers so as to obtain a glass wool, gathering such glass wools to form a glass wool mat, and subjecting the glass wool mat to press molding, wherein the above described press molding is carried out, while supplying water so that the water content of the above described glass wool mat becomes 0.1% to 7.0% by mass, and while maintaining a temperature between 250° C. and 450° C.

6 Claims, 1 Drawing Sheet

(56) References Cited

FOREIGN PATENT DOCUMENTS

| | | | |
|---|---|---|---|
| JP | 2004-011709 | | 1/2004 |
| JP | 2004-011709 | A | 1/2004 |
| JP | 2004-011755 | | 1/2004 |
| JP | 2004-011755 | A | 1/2004 |
| JP | 3578172 | | 7/2004 |
| JP | 3580315 | | 7/2004 |
| JP | 2005-180594 | | 10/2004 |
| JP | 3578172 | B1 | 10/2004 |
| JP | 3580315 | B1 | 10/2004 |
| JP | 2005-220954 | | 8/2005 |

OTHER PUBLICATIONS

Solids—Specific Heats, The Engineering ToolBox, http://www.engineeringtoolbox.com/specific-heat-solids-d_154.html, accessed Jun. 19, 2014, 11 pages.*

Fluids—Latent Heat of Evaporation, The Engineering ToolBox, http://www.engineeringtoolbox.com/fluids-evaporation-latent-heat-d_147.html, accessed Jun. 19, 2014, 7 pages.*

* cited by examiner

METHOD FOR PRODUCING GLASS WOOL MOLDED PRODUCT, GLASS WOOL MOLDED PRODUCT, AND VACUUM INSULATION MATERIAL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

The present application is a U.S. National phase of, and claims priority based on PCT/JP2005/019496, filed 24 Oct. 2005, which, in turn, claims priority from Japanese patent application 2005-167022, filed 7 Jun. 2005. The entire disclosure of each of the referenced priority documents is incorporated herein by reference.

TECHNICAL FIELD

The present invention relates to a method for producing a glass wool molded product, a glass wool molded product obtained by this production method, and a vacuum heat insulation material, into which the glass wool molded product has been incorporated as a core.

BACKGROUND ART

Glass wool molded products are lightweight and have functions such as heat insulating properties, sound insulating properties, or sound absorbency. Thus, such glass wool molded products are widely used in various fields such as in heat insulation materials used for building materials, in heat insulation materials used for automobiles, in refrigerators, or in freezers, for the purposes of thermal insulation, cold insulation, heat shielding, sound insulation, etc.

In general, soda lime is singly used as a material glass in production of a glass wool. Otherwise, an alkali borosilicate glass produced by adding several percents of boric acid to the soda lime is also used as such a material glass.

In order to produce a glass wool using the aforementioned material glass, for example, the material glass is thermally melted by high-speed rotation of a spinner having a large number of pores on the lateral face thereof, and the thus melted material glass is blown off in a fibrous state, so that the material glass can be air-cooled to obtain a glass wool. When the thus obtained glass wool is processed into a felt-like, board-like, or pipe-like molded product, immediately after the material glass has been processed into fibers, a small amount of binder is sprayed on the surfaces of fibers so that it can be applied thereto. In general, as binders used in the molding of glass wools, organic binders such as a phenol resin, an epoxy resin, an acryl resin or starch, and inorganic binders such as liquid glass, boric acid or colloidal silica, have been known.

In production of a vacuum heat insulation material used in a refrigerator, for example, the handling ability of a glass wool molded product used as a core or the smoothing properties of the surface of the vacuum heat insulation material can be improved by addition of a binder. However, if such a binder is used, the cost of the binder as a material and the number of production processes increase to lead to increases in capital investment spending and energy consumption, and as a result, the production cost is also increased. In addition, in the case of a vacuum heat insulation material, there are the following problems. That is, if an organic binder is used, the degree of vacuum is decreased due to volatile substances from the binder. On the other hand, if an inorganic binder, particularly, boric acid is used, the degree of vacuum decreases due to volatilization of bound water, so that the vacuum heat insulation material cannot maintain its heat insulation performance. Accordingly, when a binder is used, in order to stabilize the performance of a vacuum heat insulation material for a long period of time, it is necessary to increase the amount of a gas adsorbent or addition of high performance adsorbent (which is expensive). Such factors also cause cost increase. Moreover, in general, the use of an organic binder is also problematic in that the heat resistance of a glass wool is 350° C. at maximum.

Thus, a felt-like product that contains no binders has been proposed as a means for improving heat resistance. Such a felt-like product is resistant to a temperature between 400° C. and 450° C. In the case of producing a vacuum heat insulation material, for example, a glass wool used as a core generally has an area density between 1500 and 3500 g/m$^2$, and thus it has high heat insulating properties. However, if glass wools are only compressed without adding binders in the aforementioned method, the obtained glass wool product has a thickness between 70 and 100 mm. Further, the product has not been sufficiently molded, so that it is problematic in terms of extremely poor handling ability.

For the aforementioned reasons, various methods for producing a glass wool molded product with good handling ability without using binders have been developed. For example, Patent Document 1 describes a production method, which comprises subjecting glass wools to press molding at a temperature higher than the temperature at which the glass wools are thermally deformed, so that an aggregate of glass fibers can be subjected to plastic deformation in a pressurized state, thereby maintaining the form thereof.

Moreover, Patent Document 2 describes a method of molding laminated glass white wools (which are glass wools that contain no binders) within a temperature range that is 20° C. higher than the deformation point thereof.

Furthermore, Patent Document 3 describes a core formed by the adherence of inorganic fibers as a result of an intermolecular interaction caused by Si—OH groups.

Patent Document 1: Japanese Patent No. 3580315

Patent Document 2: National Publication of International Patent Application No. 2003-532845

Patent Document 3: Japanese Patent No. 3578172

In Patent Documents 1 and 2, however, since press molding is carried out at a temperature higher than the thermal deformation temperature of glass wools, the tensile stress on the fiber surface is alleviated, and thus the fiber strength is significantly decreased, so that the glass wools can easily be converted to powders. As a result, there is concern that problems regarding a decrease in handling ability during the production process or deterioration in work environment will occur. Moreover, there are also various problems caused by the release of fibrous powders during the recovery and recycling processes of a vacuum heat insulation material.

Furthermore, in the vacuum heat insulation material of Patent Document 3, adhesion of inorganic fibers is insufficient, and thus there is a problem regarding a decrease in handling ability due to the molded material returning towards its former state after compression.

SUMMARY OF THE INVENTION

In order to solve the aforementioned problems, according to an embodiment of the present invention there is provided a method for producing a glass wool molded product, comprising the steps of: processing a glass material into fibers so as to obtain a glass wool, gathering such glass wool to form a glass wool mat, supplying water to the glass wool mat so that the water content of the glass wool mat becomes 0.1% to 7.0% by mass, and subjecting the glass wool mat having said water content to press molding while maintaining a temperature between 250° C. and 450° C.

The above described water may be supplied immediately after a glass material is processed into fibers so as to obtain a glass wool or before the press molding, or both immediately after formation of such a glass wool and before the press molding. In addition, the glass wool molded product of the present invention may be obtained by the aforementioned production method, and it may be preferably used as a core of a vacuum heat insulation material.

DETAILED DESCRIPTION INCLUDING BEST MODE FOR CARRYING OUT THE INVENTION

According to the present invention, fibers can be adhered to one another without using binders, and thus return of the product towards an uncompressed state does not occur even after compression. Accordingly, the glass wool molded product produced by the method of the present invention has good handling ability. In addition, when the glass wool molded product of the present invention is used as a core of a vacuum heat insulation material, since no gas is generated from any binder under vacuum, the vacuum heat insulation material can maintain its degree of vacuum.

BEST MODE FOR CARRYING OUT THE INVENTION

Figure 1:
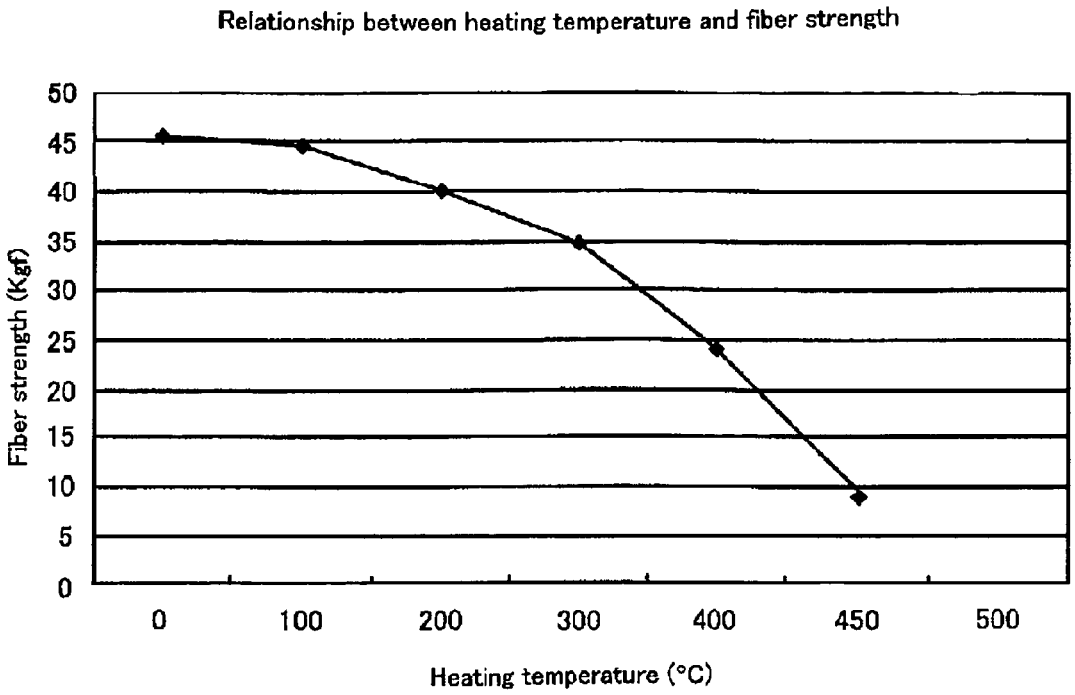
FIG. 1 is a graph showing the relationship between a heating temperature and the fiber strength of glass wools (fiber diameter: 4 μm)

The most important characteristic of the method for producing the glass wool molded product of the present invention is that the water content of a glass wool is adjusted within a specific range for the press molding step. In production of a felt-like glass wool molded product that contains no binders, the present inventors have attempted to spray water to glass wools during a glass wool-gathering process so as to wet the glass wools with the added water, thereby suppressing the release of the glass wools during the glass wool-gathering process. As a result, the inventors have found that if the amount of water sprayed is excessive, the compressed and packed glass wool does not return to its original form during storage. The present inventors have focused on the finding that when above a certain level of water is added to glass wools, the glass wools can be maintained in a board form having a density the same as that obtained when they have just been compressed, thereby completing the present invention.

In the present invention, the glass wools can be maintained in a board form without using binders because of the following mechanism. That is to say, sodium oxide contained in a glass that forms the glass wool is leached-out by water added to the surface of the glass wool. The leached-out sodium oxide is dissolved in the peripheral adhesive water, so as to generate sodium hydroxide. The generated sodium hydroxide easily reacts with silicon dioxide that is a main ingredient of the glass wool, so as to generate sodium silicate. This sodium silicate is liquid glass that is well known as an inorganic binder. Accordingly, a portion of the glass wool molded product of the present invention acts as a binder without addition of any conventional binder, and thus fibers bind to one another by action of such a binder. Therefore, the obtained molded product can be maintained in the form of a molded product for a long period of time.

In order to carry out the aforementioned reaction of sodium hydroxide with silicon dioxide rapidly, pressurization and heat treatments are carried out during the molding process. It is sufficient that the heating temperature applied during such pressurization and heat treatments is lower than the thermal deformation temperature of a glass wool.

Any known type of glass wool can be used in the present invention. The fiber diameter thereof is preferably 2 to 8 μm, and more preferably 3 to 5 μm. If such a fiber diameter is less than 2 μm, a specific energy consumption required for formation of fibers is significantly deteriorated. In contrast, if such a fiber diameter exceeds 8 μm, the thermal conductivity of the fibers is decreased, and thereby the heat insulation performance becomes poor.

In the method for producing the glass wool molded product of the present invention, a known glass material is used, such a glass material is processed into fibers by a known method so as to obtain a glass wool, and such glass wools are gathered to form a glass wool mat. When compared with the amount of water that is dispersed to suppress the release of the glass wools during the gathering process, the water content of such a glass wool mat is relatively high. The aforementioned water content is between 0.1% and 7.0% by mass, and preferably between 0.3% and 3.0% by mass.

Preferably, water is supplied to glass wools immediately after formation of fibers. It may also be possible to supply water to a glass wool mat before press molding. Otherwise, it is also preferable that water be supplied, both immediately after formation of fibers and before press molding. If the water content of the glass wool mat is less than 0.1% by mass, the amount of sodium silicate generated becomes small, and thus a good molded product cannot be obtained. On the other hand, if the above water content exceeds 7.0% by mass, water may move in the mat, and it may be thereby unevenly distributed. Thus, a board molded product with stably quality cannot be obtained, and further, certain energy becomes necessary for evaporating a large amount of water.

It is necessary that a heating temperature be maintained at least during the press molding of a glass wool mat. Further, it is preferable that such a heating temperature be maintained until the press molding is completed after water has been supplied to glass wools. Such a heating temperature is between 250° C. and 450° C., and preferably between 300° C. and 400° C. If the heating temperature is lower than 250° C., an enormous time is required for the surface reaction of water with the glass wools, and the productivity is thereby decreased. On the other hand, if the heating temperature exceeds 450° C., although molding properties are improved, the stress of the glass wools is alleviated by heating, and only a fragile board can be obtained, thereby decreasing handling ability.

For reference, a graph showing the relationship between such a heating temperature and the fiber strength of glass wools (fiber diameter: 4 μm) is as shown in FIG. 1. According to the figure, it is found that if the heating temperature exceeds 450° C., the fiber strength becomes 10 kgf or less, and thus that the fiber strength significantly decreases when compared with 45 kgf, the fiber strength at an ordinary temperature.

However, even if the heating temperature is 450° C., this temperature is 100° C. or more lower than the thermal deformation temperatures of the glass wools used in Patent Documents 1 and 2.

Figure 2:
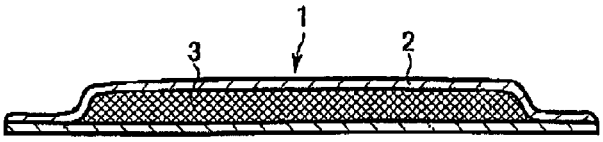
FIG. 2 is a cross-sectional view showing an example of a vacuum heat insulation material, in which the glass wool molded product of the present invention is used.

FIG. 2 is a cross-sectional view showing an example of a vacuum heat insulation material, in which the glass wool molded product of the present invention is used. A vacuum heat insulation material 1 is produced by coating a core 3 with a jacketing material 2, which is formed with a rigid or flexible plastic sheet, a metal leaf, a film onto which a metal film has been evaporated, etc. The glass wool molded product of the present invention is used as the core 3. The density of the glass wool molded product is appropriately between 150 and 300 kg/m$^3$. In addition, as a result of production of the vacuum heat insulation material 1 under a reduced pressure, or depressurization after molding, the core 3 portion is retained in a vacuum state or in a highly decompressed state. Such a vacuum heat insulation material 1 is used as a heat insulation material in refrigerators or freezers. In addition, it can also be used in architectural coating materials, automobile bodies, etc. for the purposes of heat insulation and heat shielding.

EXAMPLE

More specific example will be described below.

A glass made from common soda lime was processed into fibers having a fiber diameter of 4 μm by melting and centrifugation, so as to obtain a glass wool. Immediately after such formation of the fibers, utilizing compressed air, water was sprayed onto the glass wool. Thereafter, such glass wools were gathered to form a mat on a conveyor. At that time, the water content of the glass wool mat was 1.5% by mass, and the bulk density was 1300 g/m$^2$.

Subsequently, both ends of the thus gathered glass wool were cut with a slitter, so as to obtain a section having a length of 1600 mm. The thus obtained section was then cut with a chopper, so as to obtain a section having a width of 1600 mm, thereby obtaining a glass wool section with 1600 mm square. Subsequently, eight of the glass wool sections were laminated on a polyethylene slip sheet with a thickness of 25 μm, followed by compression and packing with a roll-up machine.

Thereafter, two of the thus compressed and packed glass wool mats were laminated, and they were then subjected to press molding under heating at 350° C. for 10 minutes. After completion of the compression, the resultant product was cooled, so as to produce a glass wool board of interest. The thus produced glass wool board had a density of 125 kg/m$^3$ and a thickness of 20 mm. The water content of the compressed and packed glass wool mat was 1.4% by mass immediately before the aforementioned press molding, and thus its water content was hardly decreased after the aforementioned glass wool-gathering process.

The glass wool board produced in the present example maintained a density of 125 kg/m$^3$, even after it had been left for 24 hours. Thus, the product did not return toward its uncompressed state after the molding process. In addition, when the glass wood board was broken with hands, pulverization of the fibers did not occur, and thus it was confirmed that the glass wood board did not deteriorate.

The method for producing the glass wool molded product of the present invention has functions such as good heat insulating properties, sound insulating properties or sound absorbency, and also has form-retaining properties, without using conventional binders. Thus, glass wool molded product of the present invention can be widely used in various fields such as heat insulation materials used for building materials, heat insulation materials used for automobiles, heat insulation materials for refrigerators or freezers, etc.

Although there have been described what are the present embodiments of the invention, it will be understood that variations and modifications may be made thereto within the scope of the claims appended hereto.

The invention claimed is:

1. A method for producing a glass wool molded product comprising the steps of:

processing a glass material into fibers so as to obtain a glass wool, gathering said glass wool to form a glass wool mat, supplying *a liquid consisting of* water to the glass wool [mat] immediately after processing the glass material into fibers so that the water content of the glass wool mat becomes 0.1% to 7.0% by mass, and subjecting the glass wool mat having said water content to press molding while maintaining a temperature between 250° C. and 450° C, *whereby the glass wool fibers in the press molded glass wool mat are bound to each other with sodium silicate generated from the glass wool and the water*.

2. The production method according to claim 1, wherein *by* said *liquid* supplying [water] step the water content of the glass wool mat becomes 0.3% to 3.0% by mass, and in said press molding step the temperature is maintained between 250° C. and 450° C.

3. The production method according to claim 1, wherein said glass material fibers have a diameter of 2-8 μm.

4. The production method according to claim 1, wherein said glass wool molded product has a density of between approximately 150-300 kg/m$^3$.

*5. A method for producing a glass wool molded product comprising the steps of:*

*processing a glass material into fibers so as to obtain a glass wool,*

*supplying a liquid consisting of water to the glass wool immediately after processing the glass material into fibers,*

*gathering said glass wool to form a glass wool mat,*

*supplying more of the liquid consisting of water to the glass mat so that the water content of the glass wool mat becomes 0.1% to 7.0% by mass, and*

*subjecting the glass wool mat having said water content to press molding while maintaining a temperature between 250° C. and 450° C., whereby the glass wool fibers in the press molded glass wool mat are bound to each other with sodium silicate generated from the glass wool and the water.*

*6. A method for producing a vacuum heat insulation material, comprising the steps of:*

*processing a glass material into fibers so as to obtain a glass wool,*

*supplying a liquid consisting of water to the glass wool immediately after processing the glass material into fibers,*

*gathering said glass wool to form a glass wool mat,*

*subjecting the glass wool mat having said water content to press molding while maintaining a temperature between 250° C. and 450° C., whereby the glass wool fibers in the press molded glass wool mat are bound to each other with sodium silicate generated from the glass wool and the water,*

*coating the press molded glass wool mat with a jacketing material, and*

*processing the jacketing material coating the press molded glass wool mat so that the jacketing material forms a*

*low-pressure hermetically sealed space filled with the press molded glass wool mat as a core,*

*wherein an amount of the liquid consisting of water supplied to the glass wool in the liquid supplying step results in a water content of the glass wool mat becoming 0.1% to 7.0% by mass prior to the press molding step.*

* * * * *